United States Patent
Fan

(10) Patent No.: US 12,547,374 B2
(45) Date of Patent: Feb. 10, 2026

(54) RANDOM NUMBER GENERATION CIRCUIT

(71) Applicant: CHANGXIN MEMORY TECHNOLOGIES, INC., Hefei (CN)

(72) Inventor: Xian Fan, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 1176 days.

(21) Appl. No.: 17/441,801

(22) PCT Filed: Jun. 17, 2021

(86) PCT No.: PCT/CN2021/100741
§ 371 (c)(1),
(2) Date: Sep. 22, 2021

(87) PCT Pub. No.: WO2022/048245
PCT Pub. Date: Mar. 10, 2022

(65) Prior Publication Data
US 2023/0067363 A1   Mar. 2, 2023

(30) Foreign Application Priority Data
Sep. 2, 2020   (CN) .......................... 202010910744.2

(51) Int. Cl.
*G06F 7/58* (2006.01)
*H03K 19/21* (2006.01)

(52) U.S. Cl.
CPC ............. *G06F 7/584* (2013.01); *H03K 19/21* (2013.01)

(58) Field of Classification Search
CPC ..................... G06F 7/58–588; G06F 2207/583
See application file for complete search history.

(56) References Cited

U.S. PATENT DOCUMENTS 5,090,035 A * 2/1992 Murase ............ G01R 31/31813
307/73
6,181,164 B1 * 1/2001 Miller ................ H03K 19/1736
326/46

(Continued)

FOREIGN PATENT DOCUMENTS

CN         1678985 A     10/2005
CN       201654762 U     11/2010
(Continued)

OTHER PUBLICATIONS

International Search Report cited in PCT/CN2021/100741 mailed Aug. 27, 2021, 9 pages.

(Continued)

*Primary Examiner* — Carlo Waje
(74) *Attorney, Agent, or Firm* — Kilpatrick Townsend & Stockton LLP

(57) ABSTRACT

The embodiments of the present disclosure provide a random number generation circuit, including: a random number generator, including a feedback module and a plurality of sequentially connected flip-flops, where an output terminal of a previous flip-flop being connected to an input terminal of a next flip-flop, the output terminal of each of the flip-flops serving as an output terminal of the random number generator, and an output terminal of the feedback module being connected to the input terminal of one of the flip-flops; the feedback module being configured to receive selection signals and select, on the basis of the selection signals, the output terminals of two of the flip-flops as input terminals of the feedback module; and the random number generator being configured to output a plurality of first random numbers corresponding to corresponding selection signals in each counting cycle.

16 Claims, 6 Drawing Sheets

(56) References Cited

U.S. PATENT DOCUMENTS

| | | | |
|---|---|---|---|
| 2007/0140485 A1 | 6/2007 | Ghigo et al. | |
| 2013/0055039 A1* | 2/2013 | Dearth | G11C 29/028 |
| | | | 708/251 |
| 2015/0149790 A1* | 5/2015 | Li | G06F 7/584 |
| | | | 713/193 |
| 2016/0147505 A1 | 5/2016 | Lee | |
| 2018/0131527 A1* | 5/2018 | Lu | H04L 9/3278 |
| 2019/0107999 A1* | 4/2019 | Ho | G06F 7/62 |
| 2019/0361677 A1* | 11/2019 | Tu | G06F 7/584 |
| 2020/0129152 A1* | 4/2020 | Jain | G01N 29/262 |

FOREIGN PATENT DOCUMENTS

| | | |
|---|---|---|
| CN | 110597488 A | 12/2019 |
| EP | 2100219 B1 | 10/2010 |

OTHER PUBLICATIONS

State Intellectual Property Office of the People's Republic of China, Office Action and Search Report Issued in Application No. 202010910744.2, Dec. 19, 2024, 10 pages.

J. Savir et al., "A multiple Seed Linear Feedback Shift Register", IEEE Transactions on Computers, vol. 41, No. 2, Feb. 1992.

Luan Zhicun et al., "Multi-mode hybrid reconfigurable PUF circuit design based on linear feedback", Application of Electronic Technique, vol. 44, No. 11, Nov. 2018.

* cited by examiner

RANDOM NUMBER GENERATION CIRCUIT

CROSS-REFERENCE TO RELATED APPLICATIONS

The present disclosure is a national stage entry of International Application No. PCT/CN2021/100741, filed on Jun. 17, 2021, which claims the priority to Chinese Patent Application 202010910744.2, titled "RANDOM NUMBER GENERATION CIRCUIT", filed on Sep. 2, 2020 The entire contents of International Application No. PCT/CN2021/100741 and Chinese Patent Application 202010910744.2 are incorporated herein by reference.

TECHNICAL FIELD

Embodiments of the present disclosure relate to, but are not limited to, a random number generation circuit.

BACKGROUND

In the current information age, information security is critical to information products, and whether encryption modules have good security performance has become a major concern.

In order to improve the security performance of the encryption modules, it is necessary to provide random numbers with good randomness as seeds to form a pseudo-random number sequence. However, the randomness of random numbers generated by current random number generation circuits still needs to be improved.

SUMMARY

The following is a summary of a subject that is described in detail herein. This summary is not intended to limit the scope of protection of the claims.

Embodiments of the present disclosure provide a random number generation circuit, including: a random number generator, including a feedback module and a plurality of sequentially connected flip-flops, where an output terminal of a previous flip-flop being connected to an input terminal of a next flip-flop, the output terminal of each of the flip-flops serving as an output terminal of the random number generator, and an output terminal of the feedback module being connected to the input terminal of another flip-flop; the feedback module being configured to receive selection signals and select, on the basis of the selection signals, the output terminals of two of the flip-flops as input terminals of the feedback module; and the random number generator being configured to output a plurality of first random numbers corresponding to corresponding selection signals in each counting cycle.

Other aspects may be apparent upon reading and understanding the accompanying drawings and detailed description.

BRIEF DESCRIPTION OF THE DRAWINGS

The accompanying drawings, which are incorporated in and constitute a part of this specification, illustrate embodiments of the present disclosure and, together with the description, serve to explain principles of the embodiments of the present disclosure. In the accompanying drawings, similar reference numerals are used to indicate similar elements. The accompanying drawings in the following description are of some, but not all, embodiments of the present disclosure. Those of ordinary skill in the art may derive other accompanying drawings from these accompanying drawings without paying creative work.

DETAILED DESCRIPTION

For making the objectives, technical solutions and advantages of embodiments of the present disclosure more obvious, the technical solutions of the present disclosure will be clearly and completely described below in conjunction with the accompanying drawings in the embodiments of the present disclosure, and obviously, the described embodiments are some, rather than all of the embodiments of the present disclosure. All other embodiments acquired by those skilled in the art without making creative efforts based on the embodiments of the present disclosure fall within the scope of protection of the present disclosure. It should be noted that the embodiments of the present disclosure and the features of the embodiments may be combined with each other without conflict.

According to background, the randomness of the random number generation circuits in the prior art still needs to be improved.

It is found through analysis that although the existing random number generation circuit has disordered the output, there is still a certain relationship between the front and rear numbers, which is not really random. As an example, a linear feedback shift register (LFSR) serves as a random number generation circuit to generate 7-bit random numbers. For a fixed random number generation circuit, a tap (the output of affect on the input) position is fixed, so the random number generation circuit may only generate one random sequence, a sequence of the front and rear numbers in a counting cycle is fixed, and the bit position affecting a next state is called the tap position.

Generation of a plurality of random sequences needs to arrange a plurality of random number generation circuits, and the tap position of each random number generation circuit is different, for example, the 7-bit LFSR has seven different tap positions, seven LFSRs with different tap positions may be designed, so as to achieve seven random sequences, and each random sequence may generate $2^7-1$ random numbers so as to increase the randomness of the random numbers.

Figure 1:
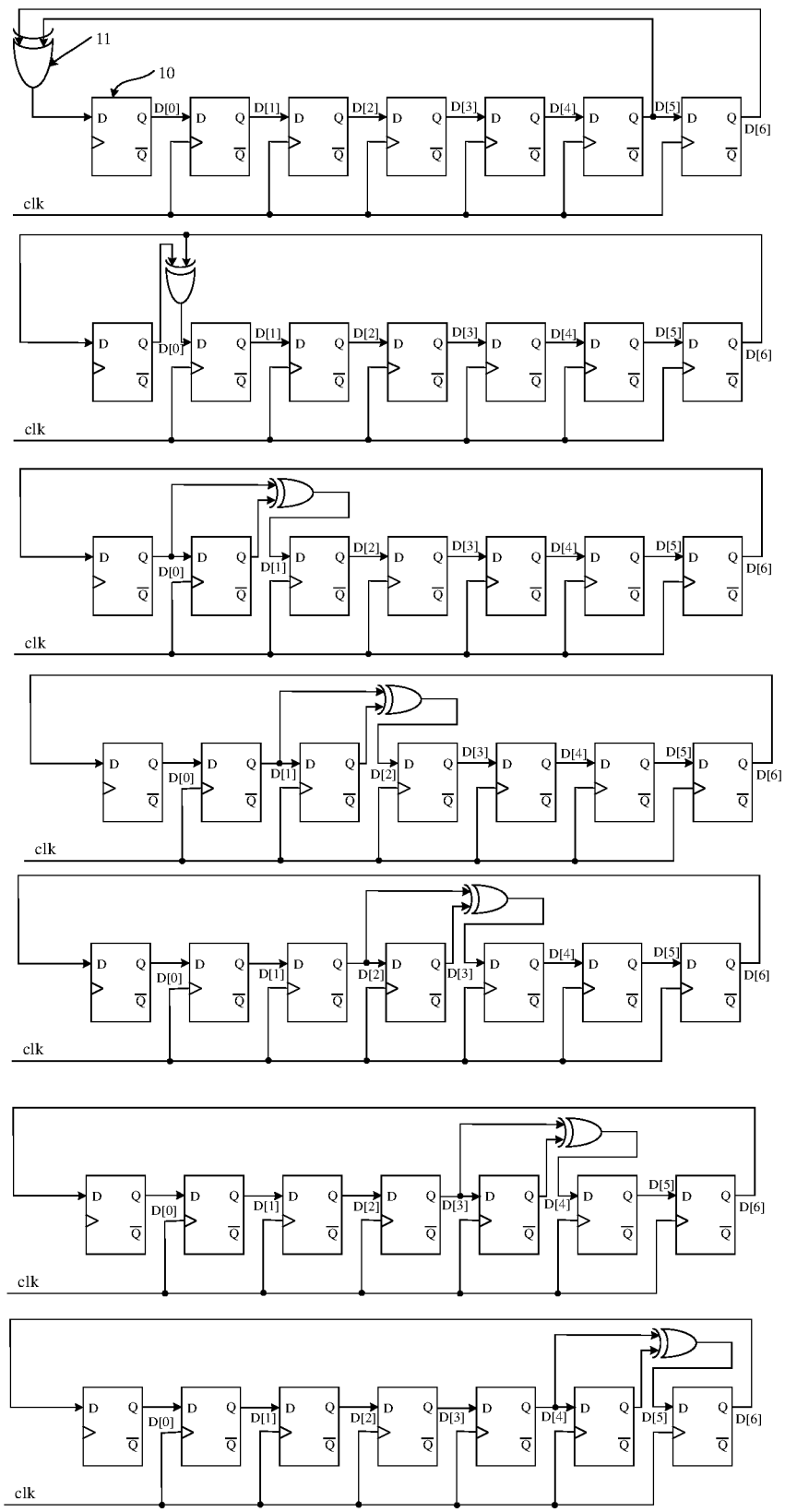
FIG. 1 is a schematic diagram of seven different circuit structures.

FIG. 1 is a schematic diagram of seven different circuit structures. As shown in FIG. 1, seven different circuit diagrams with marks 1-7 correspond to different tap positions separately, the random number generation circuit includes: 7 flip-flops 10 connected in series, where the flip-flops 10 are D flip-flops, output of the previous flip-flop 10 serves as input of the next flip-flop 10, and each flip-flop 10 receives a driving clock signal clk; and an exclusive OR gate 11, where two input terminals of the exclusive OR gate 11 are connected to an input terminal and an output terminal of one flip-flop 10, and the output terminal of the exclusive OR gate 11 serves as the input terminal of the another flip-flop 10; a position of the exclusive OR gate 11 determines the tap position of the random number generation circuit; and the flip-flops 10 are referred to as zeroth stage/first stage . . . sixth stage flip-flops 10 from left to right, and the outputs of the flip-flops 10 are D[0], D[1] . . . D[6] correspondingly.

For the circuit diagram marked as 1, the random number generation circuit generates random numbers in a first random sequence: the tap position is the zeroth stage flip-flop 10, and the outputs of the random number generation circuit are sequentially arranged as D[0], D[6], D[5], D[4], D[3], D[2], D[1] according to the bits from high to low.

For the circuit diagram marked as 2, the random number generation circuit generates random numbers in a second random sequence: the tap position is the first stage flip-flop 10, and the outputs of the random number generation circuit are sequentially arranged as D[1], D[0], D[6], D[5], D[4], D[3], D[2] according to the bits from high to low.

For the circuit diagram marked as 3, the random number generation circuit generates random numbers in a third random sequence: the tap position is the second stage flip-flop 10, and the outputs of the random number generation circuit are sequentially arranged as D[2], D[1], D[0], D[6], D[5], D[4], D[3] according to the bits from high to low.

For the circuit diagram marked as 4, the random number generation circuit generates random numbers in a fourth random sequence: the tap position is the third stage flip-flop 10, and the outputs of the random number generation circuit are sequentially arranged as D[3], D[2], D[1], D[0], D[6], D[5], D[4] according to the bits from high to low.

For the circuit diagram marked as 5, the random number generation circuit generates random numbers in a fifth random sequence: the tap position is the fourth stage flip-flop 10, and the outputs of the random number generation circuit are sequentially arranged as D[4], D[3], D[2], D[1], D[0], D[6], D[5] according to the bits from high to low.

For the circuit diagram marked as 6, the random number generation circuit generates random numbers in a sixth random sequence: the tap position is the fifth stage flip-flop 10, and the outputs of the random number generation circuit are sequentially arranged as D[5], D[4], D[3], D[2], D[1], D[0], D[6] according to the bits from high to low.

For the circuit diagram marked as 7, the random number generation circuit generates random numbers in a seventh random sequence: the tap position is the sixth stage flip-flop 10, and the outputs of the random number generation circuit are sequentially arranged as D[6], D[5], D[4], D[3], D[2], D[1], D[0] according to the bits from high to low.

It is not difficult to discover from the analysis that in order to obtain different random sequences, the tap position of the circuit diagram needs to be changed, that is, seven circuits need to be provided, which increases the circuit complexity. Furthermore, the above analysis shows that as for the circuit with the fixed bit positions of the random numbers, the changeable number of tap positions is also fixed, resulting in the changeable number of random sequences being fixed. As shown in FIG. 1 for generating 7-bit random numbers, the maximum changeable number of tap positions is also seven, the maximum number of types of generated random sequences is also seven, and accordingly, the capacity of increasing the random sequences in this way is also limited.

The embodiments of the present disclosure provide a random number generation circuit. The random number generation circuit includes a random number generator including a feedback module, an output terminal of the feedback module is connected to an input terminal of the flip-flop, the feedback module is configured to receive selection signals and select, on the basis of the selection signals, the output terminals of two flip-flops as input terminals of the feedback module, and the random number generator is configured to output a plurality of first random numbers corresponding to the corresponding selection signals in each counting cycle. Due to different selection signals, the feedback module selects the output terminals of different two flip-flops as the input terminals of the feedback module, such that the random number generator has different feedback polynomials, and the random number generator may generate a plurality of first random numbers in different random sequences, thereby increasing the random sequences of the random numbers generated by the random number generation circuit, and then improving the randomness of the random numbers.

Figure 2:
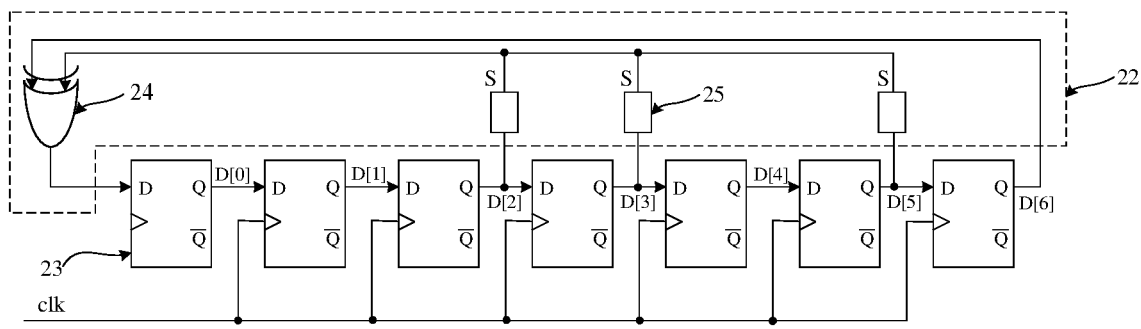
FIG. 2 is a schematic diagram of one circuit structure of a random number generation circuit provided in one embodiment of the present disclosure.

FIG. 2 is a schematic diagram of one circuit structure of a random number generation circuit provided in one embodiment of the present disclosure.

With reference to FIG. 2, in this embodiment, the random number generation circuit includes: a random number generator including a feedback module 22 and a plurality of sequentially connected flip-flops 23, where an output terminal of the previous flip-flop 23 is connected to an input terminal of the next flip-flop 23, the output terminal of each flip-flop 23 serves as an output terminal of the random number generator, and an output terminal of the feedback module 22 is connected to the input terminal of another flip-flop 23; the feedback module 22 is configured to receive selection signals S and select, on the basis of the selection signals S, the output terminals of two flip-flops 23 as input terminals of the feedback module 22, and data of an output terminal of the feedback module 22 is data for performing exclusive OR operation on the output terminals of the two flip-flops 23; and the random number generator is configured to output a plurality of first random numbers corresponding to the corresponding selection signals S in each counting cycle.

The random number generation circuit provided in this embodiment will be described in detail below with reference to the accompanying drawings.

The random number generator is an n-bit random number generator, and correspondingly, a number of the plurality of first random numbers is $2^n-1$; and the random number generator receives a driving clock signal clk to generate the first random numbers. A cycle for generating all the different first random numbers by the random number generator is a counting cycle.

The random number generator has n first output terminals, each first output end has a fixed bit position, and n is an integer greater than 1, for example, 4, 7, 10, etc. The random number generator may be a linear feedback shift register and includes n flip-flops connected in series, the output terminal of each flip-flop serves as one of n first output terminals, and bit position of the output terminal of each flip-flop is different.

The number of flip-flops 23 is n. In this embodiment, as shown in FIG. 2, as an example, n is 7, and the output terminals of the flip-flops 23 are sequentially marked as D[0], D[1], D[2] . . . D[6] in FIG. 2.

The random number generator has a tap position, the random number generator generates the first random numbers according to specific feedback polynomials in each counting cycle, the different tap positions correspond to the different feedback polynomials, and therefore the random sequences of the generated first random numbers are different, and the tap position is related to the flip-flops 23 connected to the input terminals of the feedback module 22. The tap position may be defined according to a tap sequence, for example, D[5] and D[6] serve as the input terminals of the feedback module 22, and then the tap sequence is (6, 5); or D[6] and D[4] serve as the input terminals of the feedback module 22, and then the tap sequence is (6, 4).

The tap sequence is related to the feedback polynomial of the random number generator, a feedback polynomial can also be called a feedback function. The random number generator has different feedback polynomials for different tap sequences, the feedback module 22 defines the different feedback polynomials on the basis of the output terminals of the selected flip-flops 23, and the random number generator generates the first random numbers on the basis of the feedback polynomials; under the condition of the identical feedback polynomial, the sequence of a plurality of the first random numbers generated in the counting cycles are identical; and under the condition of the different feedback polynomials, the sequences of a plurality of the first random numbers generated in the different counting cycles are different. In this embodiment, the feedback module 22 selects, on the basis of the selection signals, the output terminals of different flip-flops as the input terminals of the feedback module, to adjust the tap sequence so as to change the random sequence of the generated first random numbers, in other words, the $2^n-1$ first random numbers are generated in each counting cycle, but in different counting cycles, the sequences in which the $2^n-1$ first random numbers are generated are changed, thereby improving the randomness of the random numbers generated by the random number generator.

The output terminal of the feedback module 22 is connected to the input terminal of the fixed flip-flop 23, and the input terminals of the feedback module 22 may be connected to the output terminals of different flip-flops 23. It should be noted that a selection principle of the flip-flops 23 as the input terminals of the feedback module 22 is that the random number generator may provide $2^n-1$ first random numbers in each counting cycle. Therefore, the feedback module 22 may be reasonably arranged according to different circuit structures of the random number generator, that is, the output terminals, which may serve as the input terminals of the feedback module 22, of the plurality of flip-flops 23 are reasonably selected, so as to ensure that the random number generator can generate the $2^n-1$ first random numbers when the output terminals, selected by the feedback module 22, of the two flip-flops 23 serve as the input terminals of the feedback module 22.

It should also be noted that in other embodiments, even if the feedback module selects the output terminals of the two flip-flops to serve as the input terminals of the feedback module and the number of first random numbers generated by the corresponding random number generator in a single counting cycle is less than $2^n-1$, the randomness of the random numbers generated by the random number generation circuit may be increased, and this is due to the fact that although the number of random numbers generated in the single counting cycle is reduced, the random sequences of the first random numbers generated by the same random number generation circuit in different counting cycles are different, which may still improve the randomness of the random numbers generated by the random number generation circuit on the whole.

In this embodiment, the feedback module 22 includes: an exclusive OR gate 24 provided with a first input terminal and a second input terminal, the first input terminal being connected to the output terminal of one flip-flop 23, and the second input terminal being connected to the output terminals of at least two flip-flops 23; and at least two switch units 25, each switch unit 25 being connected between the second input terminal and the output terminal of the corresponding flip-flop 23, and receiving the selection signal S to electrically connect the second input terminal and the output terminal of the corresponding flip-flop 23 or disconnect the second input terminal from the output terminal of the corresponding flip-flop 23.

It should be understood that the exclusive OR gate of the feedback module may also be replaced with an exclusive NOR gate in other embodiments.

In this embodiment, the switch unit 25 is a fuse. In other embodiments, the switch unit may also be an anti-fuse.

In this embodiment, the first input terminal is connected to the output terminal of the fixed flip-flop 23. In other embodiments, the feedback module may further include: the first input terminal is connected to the output terminals of the at least two flip-flops, the switch unit is connected between the first input terminal and the output terminal of the corresponding flip-flop, and the output terminals of the different flip-flops are connected to the first input terminal by connecting or disconnecting the different switch units. Therefore, the random sequences of the random numbers generated by the random number generation circuit may be further increased.

A working principle of the random number generation circuit provided in this embodiment will be explained below in conjunction with FIG. 2.

In one counting cycle, the switch units 25 receive a first type of selection signals S, so as to make D[5] serve as the second input terminal of the exclusive OR gate 24; and correspondingly, the tap sequence is determined by two flip-flops 23 corresponding to D[5] and D[6], and the first random numbers in a first type of random sequence is generated in the counting cycle.

In another counting cycle, the switch units 25 receive a second type of selection signals S, so as to make D[3] serve as the second input terminal of the exclusive OR gate 24; and correspondingly, the tap sequence is determined by two flip-flops 23 corresponding to D[4] and D[6], and the first random numbers in a second type of random sequence is generated in the counting cycle.

In yet another counting cycle, the switch units 25 receive a third type of selection signals S, so as to make D[2] serve as the second input terminal of the exclusive OR gate 24; and correspondingly, the tap sequence is determined by two flip-flops 23 corresponding to D[2] and D[6], and the first random numbers in a third type of random sequence is generated in the counting cycle.

Therefore, the same random number generation circuit may generate the first random numbers in various random sequences, thereby increasing the randomness of the random numbers.

Figure 3:
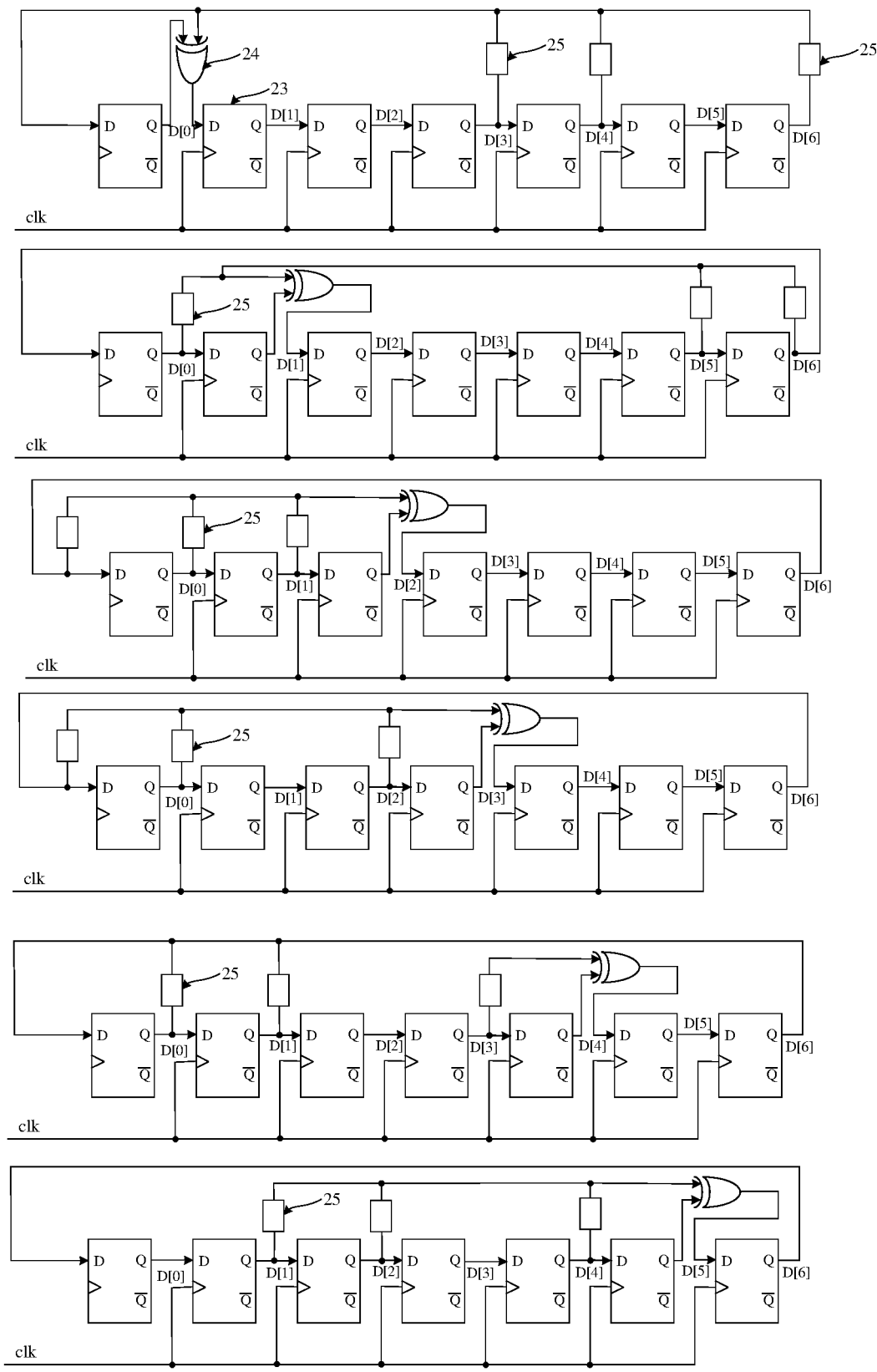
FIG. 3 is a schematic diagram of a plurality of circuit structures of the random number generation circuit provided in one embodiment of the present disclosure.

Furthermore, for the random number generator with the identical number of flip-flops 23, the random number generator has adjustable tap positions with specific reference to FIG. 3. FIG. 3 is a schematic diagram of a plurality of circuit structures of the random number generator in FIG. 2, and specifically illustrates the circuit structures of the random number generator with the remaining six different tap positions corresponding to FIG. 2.

In the random number generation circuit provided in the embodiment, the feedback module 22 defines the feedback polynomials of the random number generator, since the feedback module 22 selects the output terminals of the different flip-flops 23 as the input terminals of the feedback module 22 on the basis of the different selection signals, the same random number generator has different feedback polynomials, and therefore, the random number generator may provide the first random numbers in different random sequences on the basis of the different feedback polynomials, thereby improving the randomness of the random numbers generated by the random number generation circuit.

Another embodiment of the present disclosure further provides a random number generation circuit. The random number generation circuit is substantially identical to that in the foregoing embodiment, with the main difference being that the random number generation circuit further includes a control signal generation module and a multi-selection module. The random number generation circuit provided in another embodiment of the present disclosure will be described in detail below with reference to the accompanying drawing.

Figure 4:
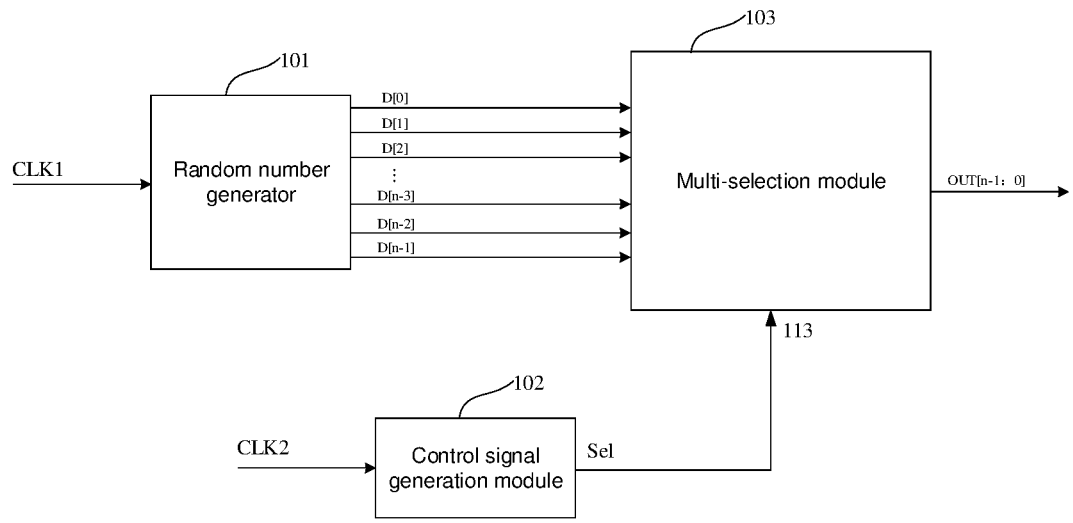
FIG. 4 is a functional block diagram of a random number generation circuit provided in another embodiment of the present disclosure.

FIG. 4 is a functional block diagram of a random number generation circuit provided in another embodiment of the present disclosure.

With reference to FIG. 4, in this embodiment, the random number generation circuit includes: a random number generator 101 configured to output a plurality of first random numbers in each counting cycle; a control signal generation module 102 configured to receive a trigger signal CLK2 and output, on the basis of the trigger signal CLK2, control signals Sel corresponding to different first random numbers; and a multi-selection module 103 configured to receive the first random numbers and the control signals Sel corresponding to the first random numbers, adjust, on the basis of the control signals Sel, at least one bit position of the first random numbers to obtain second random numbers, and output a plurality of the second random numbers.

The random number generation circuit provided in this embodiment will be described in detail below with reference to the accompanying drawing.

The random number generator 101 is an n-bit random number generator, and correspondingly, a number of the plurality of first random numbers is $2^n-1$; and the random number generator 101 receives a driving clock signal CLK1 to generate the first random numbers. A cycle for generating all the different first random numbers by the random number generator 101 is a counting cycle.

The random number generator 101 has n first output terminals, each first output terminal has a fixed bit position, and n is an integer greater than 1, for example, 4, 7, 10, etc. The random number generator 101 may be a linear feedback shift register and includes n flip-flops connected in series, the output terminal of each flip-flop serves as one of n first output terminals, and bit position of the output terminal of each flip-flop is different.

In one example, the first output terminals (that is, the output terminals of the flip-flops) are marked as D[0], D[1], D[2], ... D[n−3], D[n−2], and D[n−1], and the bit positions of the first output terminals may be arranged from high to low in an order of D[0], D[n−1], D[n−2], D[n−3], ... D[2], and D[1], n is greater than 3. In this embodiment, the random number generator 101 may generate the first random numbers in a random sequence, that is, the random number generator 101 may be a linear feedback shift register with a changeable tap position. The detailed description of the random number generator 101 may refer to the foregoing embodiments, and will not be repeated below.

The control signal generation module 102 has a trigger terminal configured to receive the trigger signal CLK2 and also has a signal output terminal configured to output the control signals Sel.

In order to improve the synchronicity of the control signals Sel and data output by the first output terminals, in this embodiment, the trigger signal CLK2 is associated with the random number generator 101. Therefore, the synchronism of the change of the control signals Sel when the first random numbers change may be improved.

In one example, the control signal generation module 102 may be further configured that the different first random numbers are first random numbers in different counting cycles; in the same counting cycle, the control signal Sel is unchanged; and the control signal Sel corresponding to one counting cycle is different from the control signal Sel corresponding to the adjacent counting cycle. Thus, in the same counting cycle, the multi-selection module 103 has identical bit position adjustment mode for the plurality of first random numbers in the same counting cycle, that is, the second random numbers are obtained based on the first random numbers in the identical mode, thereby reducing the complexity of the circuit.

The trigger signal CLK2 may be a trigger driving clock signal, and a clock cycle of the trigger driving clock signal is equal to the counting cycle. Alternatively, the trigger signal CLK2 may also be output by the random number generator 101, that is, the random number generator 101 outputs a expiration signal after completing a counting cycle, and the control signal generation module 102 receives the expiration signal as the trigger signal.

In another example, the control signal generation module 102 may be configured that the different first random numbers include the first random numbers in each counting cycle, and the different first random numbers correspond to different control signals Sel in the same counting cycle. Thus, since in the single counting cycle, the control signals Sel are different, the multi-selection module 103 may have different bit position adjustment modes for each of the first random numbers in the same counting cycle, thereby further improving the randomness of the second random numbers. Because the control signals Sel in the same counting cycle are different, the randomness of the first random numbers in the same counting cycle may be increased while the randomness of the first random numbers in different counting cycles is increased.

The random number generator 101 receives the driving clock signal CLK1 to generate the first random numbers, and the control signal generation module 102 receives the driving clock signal CLK1 as the trigger signal CLK2.

In this embodiment, the multi-selection module 103 includes: a chip selection input terminal 113 configured to receive the control signal Sel; and data input terminals connected to the n first output terminals and configured to receive the first random number; the multi-selection module 103 has N different bit position adjustment modes, and each bit position adjustment mode corresponds to one control signal, where N is an integer greater than or equal to 1; and the multi-selection module 103 is further configured to adjust bit positions of the n first output terminals to obtain the second random numbers.

The multi-selection module 103 includes data output terminals OUT[n−−1:0] outputting n-bit second random numbers.

The random sequences of the second random numbers output by the multi-selection module 103 is N times more than the random sequences of the first random numbers generated by the random number generation circuit 101.

The types of the control signals Sel are greater than or equal to N, it is guaranteed that all different bit position adjustment modes are used for adjusting the bit positions of the first random numbers, thereby increasing the random sequences of the second random numbers. Therefore, the control signal generation module 102 may be reasonably set according to N, so as to guarantee that the types of the generated control signals Sel meet a requirement.

In this embodiment, N is greater than or equal to n, which is beneficial for increasing the random sequences of the second random numbers. The bit position arrangement of the data of the n first output terminals is a first bit position arrangement, the data output by the output terminals of the multi-selection module 103 may have N second bit position arrangements, and each second bit position arrangement is obtained after adjusting the first bit positions on the basis of one bit position adjustment mode.

It should be noted that in order to preserve the random sequences of the first random numbers generated by the random number generator 101, at least one second bit position arrangement is identical to the first bit position arrangement. It should also be noted that in other embodiments, N may also equal to 1.

Furthermore, for reducing the circuit complexity of the multi-selection module 103, the multi-selection module 103 may be further configured that in the N second bit position arrangements, a position of the output terminal of the multi-selection module 103 corresponding to the datum of one bit is different, and a position arrangement of the output terminals of the multi-selection module 103 corresponding to the data of the remaining bits is unchanged. For example, from the highest bit to the lowest bit, the first bit position arrangement is D[0], D[n−1], D[n−2], . . . D[3], D[2], D[1]; and from the highest bit to the lowest bit, the second bit position arrangements include a plurality of arrangement modes in Table 1.

TABLE 1

| 1 | D[0] | D[n-1] | D[n-2] | D[n-3] | ... | D[3] | D[2] | D[1] |
|---|------|--------|--------|--------|-----|------|------|------|
| 2 | D[1] | D[0]   | D[n-1] | D[n-2] | ... | D[4] | D[3] | D[2] |
| 3 | D[2] | D[1]   | D[0]   | D[n-1] | ... | D[5] | D[4] | D[3] |
| ... | ... | ...   | ...    | ...    | ... | ...  | ...  | ...  |
| n-1 | D[n-2] | D[n-3] | D[n-4] | D[n-5] | ... | D[1] | D[0] | D[n] |
| n   | D[n-1] | D[n-2] | D[n-3] | D[n-4] | ... | D[2] | D[1] | D[0] |

It should be understood that in other embodiments, it is also possible that positions, correspond to the output terminals of the multi-selection module 103, of the data of at least two bits are different. As for the n first output terminals, the bit position of the data corresponding to each of the first output terminal may be changed and have $C_n^{n-1}$ changes in total according to different permutations and combinations, that is, N and n satisfy: $N \leq C_n^{n-1}$, namely, $N \leq n \times (n-1) \times (n-2) \ldots 2 \times 1$.

To reduce the complexity of the multi-selection module 103, N may equal to n.

It should be understood that in other embodiments, N may also be less than n.

In this embodiment, the random number generator 101 outputs the binary first random numbers, and correspondingly, the multi-selection module 103 outputs the binary second random numbers.

According to the random number generation circuit provided in the embodiment, the multi-selection module 103 may reorder the bit positions of the first random numbers, so as to generate more random sequences, thereby further improving the randomness of the random numbers of the random number generation circuit. In addition, compared with a plurality of random number generators with different tap positions, the circuit structure of this embodiment is simpler, and power consumption is lower.

Yet another embodiment of the present disclosure further provides a random number generation circuit. The random number generation circuit is substantially identical to that in the foregoing embodiment, with the main difference of including a more detailed description of the various modules. The random number generation circuit provided in yet another embodiment of the present disclosure will be described in detail below with reference to the accompanying drawings. Reference may be made to the identical or corresponding portions of the foregoing embodiments, which will not be repeated in detail below.

Figure 5:
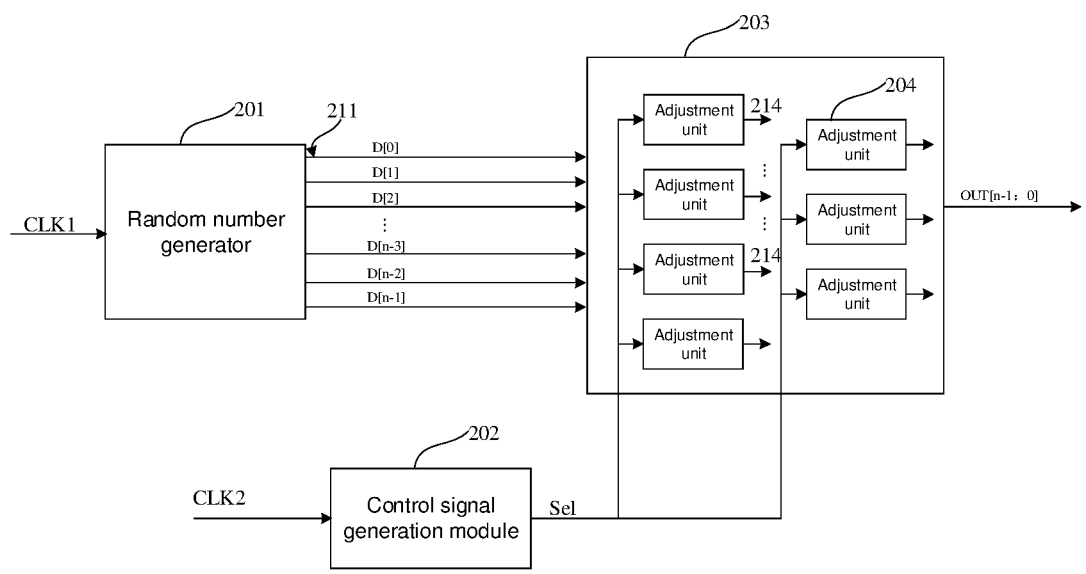
FIG. 5 is a functional block diagram of a random number generation circuit provided in yet another embodiment of the present disclosure.

FIG. 5 is a functional block diagram of a random number generation circuit provided in yet another embodiment of the present disclosure.

With reference to FIG. 5, in this embodiment, the random number generation circuit includes: an n-bit random number generator 201 having n first output terminals 211; a control signal generation module 202; a multi-selection module 203 having a chip selection input terminal and data input terminals, where the multi-selection module 203 having data output terminals OUT[n−1:0].

The multi-selection module 203 includes: N adjustment units 204, each adjustment unit 204 defining one bit position adjustment mode; and each adjustment unit 204 having the data input terminals, and each adjustment unit 204 having the chip selection input terminal. Each adjustment unit 204 being configured to receive a control signal Sel, and the adjustment unit 204 corresponding to the control signal Sel outputting second random numbers.

That is, the output terminals of each adjustment unit 204 serve as the data output terminals OUT[n−1: 0] of the multi-selection module 203, the control signal Sel serves as chip selection signals of the adjustment unit 204, and the output terminals of the corresponding adjustment unit 204 are selected as the data output terminals OUT[n−1: 0] of the multi-selection module 203 on the basis of the control signal Sel.

Each of then first output terminals 211 is marked as D[n−1], D[n−2] . . . D[3], D[2], D[1], D[0] according to the bit position of the respective output data.

A bit position arrangement of the data of the n first output terminals 211 is a first bit position arrangement, for example, D[0], D[n−1], D[n−2] . . . D[3], D[2], D[1]. Each adjusting unit 204 has n second output terminals 214, a bit position arrangement of the data of the n second output terminals 214 are a second bit position arrangement, the second bit position arrangements are different, the second bit position arrangements are different from the first bit position arrangement, for example, the second bit position arrangement may be D[n−1], D[n−2] . . . D[3], D[2], D[1], D[0], etc. For a detailed description of the second bit position arrangement and the first bit position arrangement, reference may be made to the foregoing embodiments.

In this embodiment, for example, the number of the adjustment units 204 is equal to the number of bits of the first random numbers of the random number generator 201, that is, N equals to n. In other embodiments, the number of adjustment units may be greater than or less than the number of bits of the random number generator.

Figure 6:
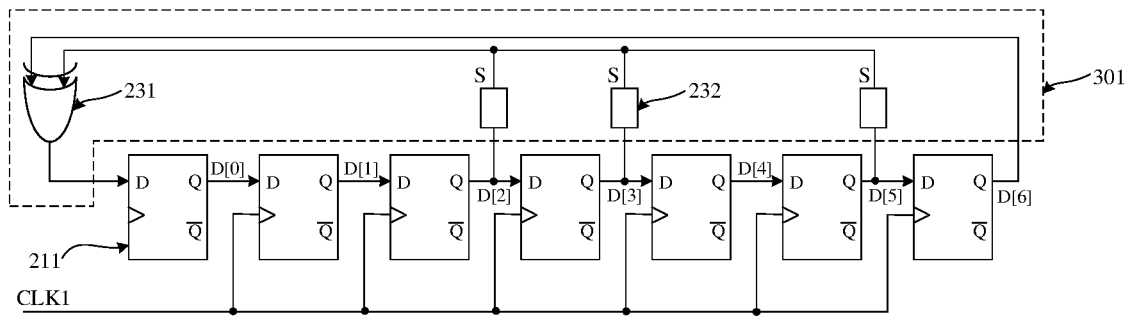
FIG. 6 is a schematic diagram of a circuit structure of a random number generator in FIG. 5.

FIG. 6 is a schematic diagram of a circuit structure of a random number generator 201 provided in this embodiment.

With reference to FIG. 6, the random number generator 201 is a linear feedback shift register and includes: n flip-flops 211 and an exclusive OR gate 231, an input terminal and an output terminal of one flip-flop 211 serving as two input terminals of the exclusive OR gate 231, and the output terminal of the exclusive OR gate 231 being connected to the input terminal of another flip-flop 211. A position of the exclusive OR gate 231 defining a tap position of the random number generator 201, and the output terminal of each flip-flop 211 serving as a first output terminal 211 (with reference to FIG. 5).

Furthermore, the random number generator 201 further includes a feedback module 301, where the feedback module 301 is configured to receive selection signals S and select, on the basis of the selection signals S, the output terminals of two flip-flops 211 as input terminals of the feedback module 301. The feedback module 301 includes the exclusive OR gate 231 and at least two switch units 232. The detailed description of the random number generator 201 may refer to the foregoing embodiments, and will not be repeated below.

According to a series connection sequence, the remaining flip-flops 211 are sequentially marked as the zeroth stage flip-flops, the first stage flip-flop, the second stage flip-flop . . . the (n−1)th stage flip-flop.

In this embodiment, as an example, the random number generator 201 is a 7-bit random number generator and is a binary 7-bit random number generator, and 127 first random numbers are generated in a counting cycle. In FIG. 6, the random number generator 201 has seven flip-flops 211, and the position of the exclusive OR gate 231 determines the bit position arrangement of the data of the n first output terminals 211. For example, in FIG. 6, when the switch unit 232 connected to D[54] is connected and the remaining switch units 232 are disconnected, the bit position arrangement of the data of the seven first output terminals 211 is D[0], D[6], D[5], D[4], D[3], D[2], D[1]; and furthermore, the two input terminals of the exclusive OR gate 231 determine a random sequence of the generated first random numbers.

Figure 7:
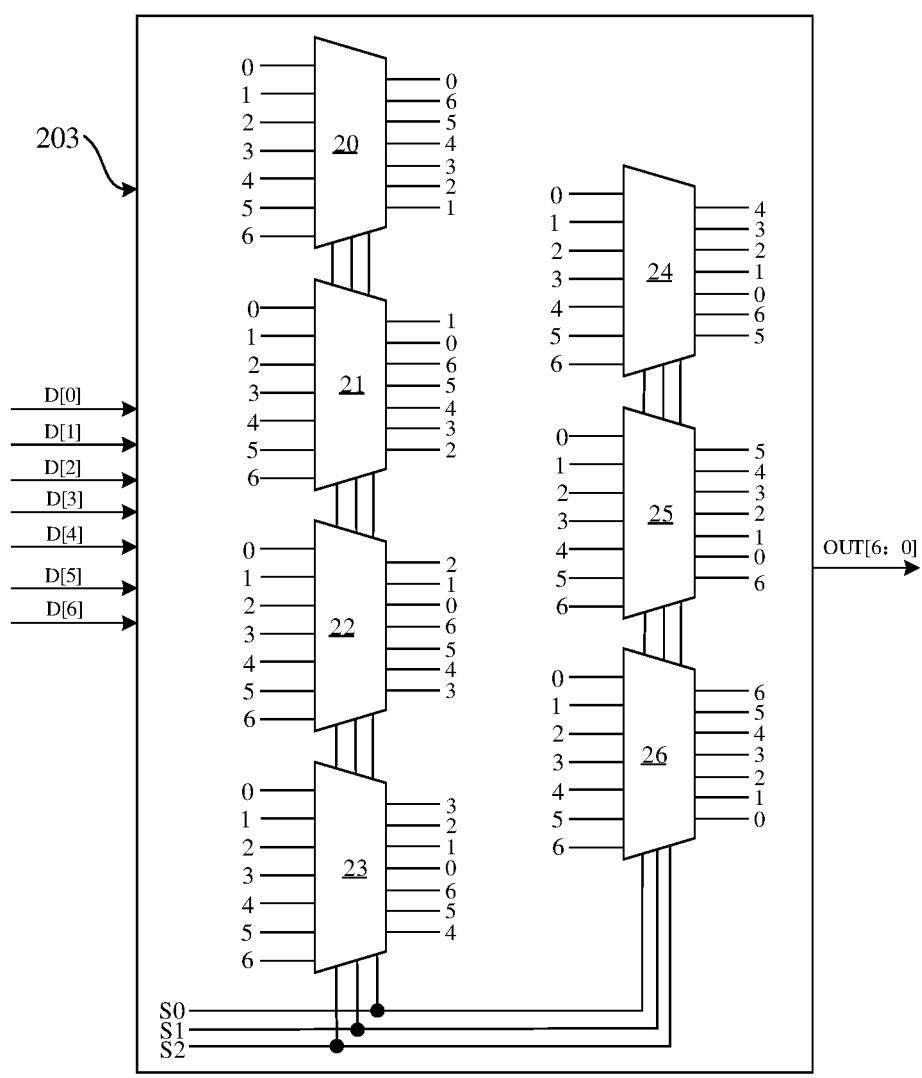
FIG. 7 is a structural schematic diagram of a multi-selection module in FIG. 6.

FIG. 7 is a structural schematic diagram of the multi-selection module 203 provided in the embodiment, including seven adjustment units 204 (with reference to FIG. 5). The n first output terminals 211 (with reference to FIG. 5) serve as the input terminals of each adjustment unit 204, and for ease of illustration simplicity, the input terminals of each adjustment unit 204 in FIG. 7 replace D[0] with 0, replace D[1] with 1, and so on, and the second output terminals 214 replace D[0] with 0, and so on. It should be noted that the data marked as D[0] is data of the zeroth first output terminal 211, the data marked as D[1] is data of the first output terminal 211, and so on.

In FIG. 7, different adjustment units 204 are marked as 20/21/22/23/24/25/26 for ease of illustration. The second output terminals of each adjustment unit 204 is arranged differently, for example, according to an arrangement from top to bottom indicating an order of bits of the data from high to low, the second output terminals of the adjustment unit 204 marked as 20 output the data of D[0], D[6], D[5], D[4], D[3], D[2], D[1], and the second output terminals of the adjustment unit 204 marked as 21 output the data of D[1], D[0], D[6], D[5], D[4], D[3], D[2].

In this embodiment, the random number generator 201 has a fixed tap position, and the multi-selection module 203 is applied to simulate the random numbers generated by adjusting the tap position of the random number generator 201. Correspondingly, the multi-selection module 203 has n different adjustment units 204. As shown in FIG. 7, the adjustment unit 204 marked as 20 is configured to simulate the LFSR when the tap position of the random number generator 201 is located at the zeroth stage flip-flop in FIG. 6, the adjustment unit 204 marked as 21 is configured to simulate the LFSR when the tap position is located at the first stage flip-flop in FIG. 6, the adjustment unit 204 marked as 22 is configured to simulate the LFSR when the tap position is located at the second stage flip-flop in FIG. 6, and so on.

It should be noted that in this embodiment, as an example, the random number generator 201 is a 7-bit random number generator. In other embodiments, the random number generator may also be a random number generator of any bit, for example, 3-bit, 4-bit, 10-bit, 20-bit, etc.

In this embodiment, the control signal generation module 202 includes: an m-bit counter 212, wherein a relationship between the N and the m satisfies: $N \leq 2^m - 1$, m is any natural number, and N is any natural number greater than or equal to 2. Where m is greater than or equal to the result by rounding down lgN/lg2+1. For example, when N is 7, m is greater than or equal to 3.

Figure 8:
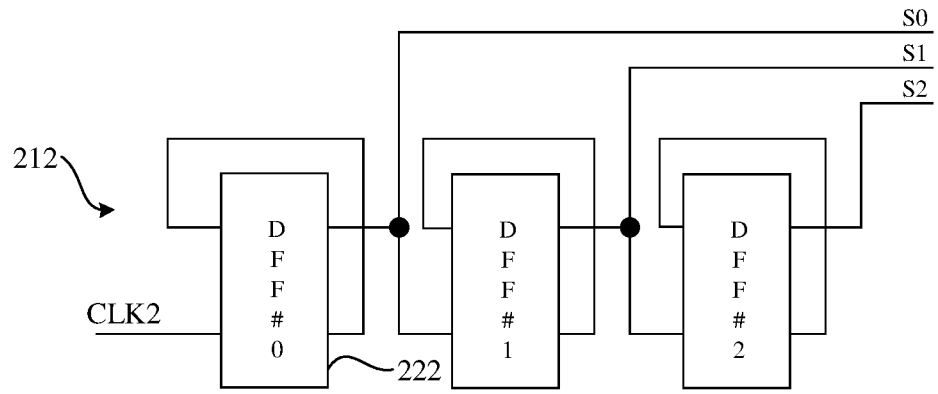
FIG. 8 is a structural schematic diagram of a control signal generation module in FIG. 6.

As shown in FIG. 8, the m-bit counter 212 includes m flip-flops 222; the trigger signal CLK2 serves as a clock input signal of the first flip-flop 222, the output terminal of the previous flip-flop 222 serves as a clock input signal of the next flip-flop 222, and the output terminals of the m flip-flops 222 jointly output a control signal Sel.

In this embodiment, N is 7, so the counter 212 includes three flip-flops 222, marked as DFF #0, DFF #1 and DFF #2 separately.

The random number generator 201 is further configured to output a expiration signal upon end of each counting cycle, and the control signal generation module 202 receives the expiration signal as the trigger signal. In this way, in the same counting cycle, the control signal Sel is unchanged; and different counting cycles correspond to different control signals Sel.

In this embodiment, the control signal generation module 202 is a 3-bit counter having three output terminals S0/S1/S2, and the control signals Sel are shown in Table 2:

TABLE 2

| S2 (most significant bit) | S1 | S0 (least significant bit) | Sel |
|---|---|---|---|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |

A working principle of the random number generation circuit provided in this embodiment will be explained below in conjunction with the accompanying drawings.

In the first counting cycle, the random number generator 201 generates a plurality of first random numbers, the control signal Sel remains unchanged as 0, the adjustment unit 204 marked as 20 in the corresponding multi-selection module 203 is selected, the second output terminals 214 output a plurality of second random numbers, and the sequence of the second random numbers is identical to that of the first random numbers.

When the first counting cycle is completed, the random number generator 201 outputs the expiration signal, the expiration signal serves as the trigger signal of the counter, S2S1S0 is changed from 000 to 001, the control signal Sel is changed from 0 to 1, correspondingly, the adjustment unit 204 marked as 21 is selected, and in the second counting cycle, the second output terminals of the adjustment unit 204 marked as 21 output a plurality of second random numbers, and the sequence of the second random numbers is different from the sequence of the first random numbers.

By analogy, after each counting cycle is completed, the control signal Sel output by the output terminals of the counter is a value, corresponding to the last counting cycle, +1, so that the second output terminals of another adjustment unit 204 are selected as the output terminals of the multi-selection module 203.

Therefore, as for seven counting cycles, the sequence of the second random numbers in each counting cycle is changed, and the number of random sequences of the second random numbers is seven, so as to further increase the randomness of the random numbers generated by the random number generation circuit.

Figure 9:
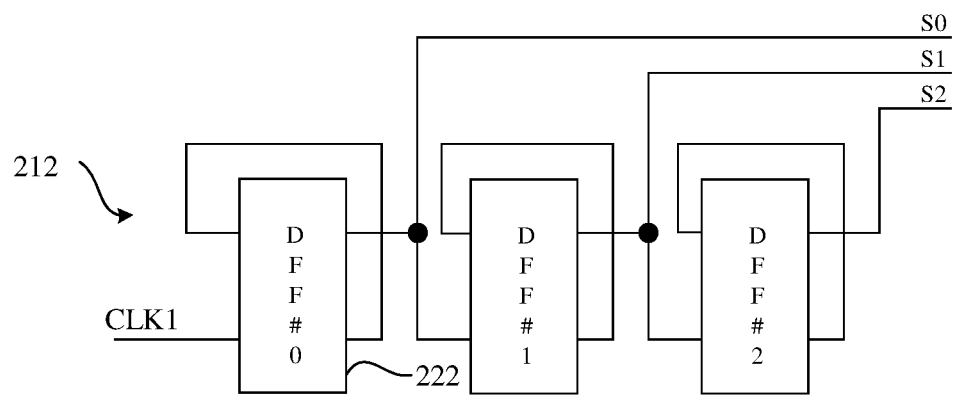
FIG. 9 is another structural schematic diagram of the control signal generation module in FIG. 6.

In another example, as shown in FIG. 9, the trigger signal of the counter is identical to the driving clock signal of the random number generator 201. In each counting cycle, different first random numbers correspond to different control signals Sel, so different adjustment units 204 may be called to perform bit positions rearrangement in each counting cycle, thereby further increasing the randomness of the random numbers, and favorably generating more random sequences. A working principle of the random number generation circuit is as follows:

In each counting cycle, the random number generator 201 generates a first random number, the control signal Sel output by the counter is 0, and the adjustment unit 204 marked as 20 is selected to generate a second random number; the random number generator 201 generates the second random number, the control signal Sel output by the counter is 1, and the adjustment unit 204 marked as 21 is selected to generate a second random number; the control signal Sel output by the counter is 2, and the adjustment unit 204 marked as 22 is selected to generate a second random number, and so on; and when the control signal output by the counter is 7, the counter starts counting again from 0. It should be understood that the number of adjustment units 204 in the multi-selection module 203 may be identical to the number of first random numbers generated in each counting cycle, and the counter is set according to the number of adjustment units 204. It should be noted that the foregoing control signals Sel and the corresponding selected adjustment units 204 are merely examples, and it is only guaranteed that different control signals Sel correspond to different adjustment units 204.

Figure 10:
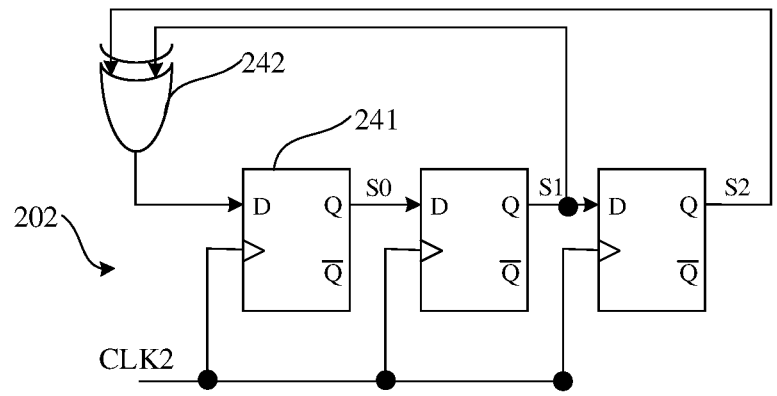
FIG. 10 is yet another structural schematic diagram of the control signal generation module in FIG. 6.

In yet another example, as shown in FIG. 10, the control signal generation module 202 may be an M-bit pseudo-random number generation circuit, and the pseudo-random number generation circuit receives the same driving clock signal CLK as the random number generator 201. Compared with the counter, the control signals output by the pseudo-random number generation circuit have more randomness, so the adjustment units 204 corresponding to the different first random numbers have more randomness, thereby further improving randomness of the random numbers generated by the random number generation circuit.

The pseudo-random number generation circuit includes M D flip-flops 241 and a first exclusive OR gate 242, the pseudo-random number generation circuit has output terminals S0/S1/S2, and a signal of the output terminals serves as a control signal.

Compared with the previous embodiment, the random number generation circuit provided in this embodiment may generate random numbers in N different random sequences on the basis of the random number generator 201 with the identical structure, thereby further improving the safety of using the random number generation circuit.

Other implementations of the present disclosure will easily be thought of by those skilled in the art upon consideration of the specification and practical disclosure. The present disclosure is intended to cover any variations, uses, or adaptable changes of the present disclosure, and these variations, uses, or adaptable changes follow general principles of the present disclosure and include common general knowledge or customary technical means in the technical field not disclosed in the present disclosure. The specification and embodiments are considered to be exemplary only, and a true scope and spirit of the present disclosure are indicated by the following claims.

It should be understood that the present disclosure is not limited to the precise structure that has been described above and shown in the accompanying drawings, and that various modifications and changes may be made without departing from its scope. The scope of the present disclosure is limited only by the appended claims.

INDUSTRIAL APPLICABILITY

According to a random number generation circuit provided in the present disclosure, a feedback module receives selection signals and selects, on the basis of the selection signals, output terminals of two flip-flops as input terminals of the feedback module, such that the random number generator has different feedback polynomials, and the random number generator may generate a plurality of first random numbers in different random sequences, thereby increasing the random sequences of the random numbers generated by the random number generation circuit, and then improving the randomness of the random numbers.

The invention claimed is:

1. A random number generation circuit, comprising:
a random number generator, comprising a feedback circuit and a plurality of sequentially connected flip-flops, wherein an output terminal of a previous flip-flop being connected to an input terminal of a next flip-flop, the output terminal of each of the flip-flops serving as an output terminal of the random number generator, and an output terminal of the feedback circuit being connected to the input terminal of one of the flip-flops;
the feedback circuit being configured to receive selection signals and select, based on the selection signals, the output terminals of two of the flip-flops as input terminals of the feedback circuit; and the random number generator being configured to output a plurality of first random numbers corresponding to corresponding selection signals in each counting cycle;

a control signal generation circuit, configured to receive a trigger signal and output, based on the trigger signal, control signals corresponding to different first random numbers; and a multi-selection circuit configured to receive the plurality of first random numbers and the control signals corresponding to the different first random numbers, adjusting, based on the control signals, at least one bit position of the plurality of first random numbers to obtain second random numbers, and outputting a plurality of the second random numbers;

wherein the control signal generation circuit comprises: an m-bit counter, m is a natural number;

wherein the m-bit counter includes m flip-flops; the trigger signal serves as a clock input signal of a first flip-flop, an output terminal of a previous flip-flop serves as a clock input signal of a next flip-flop, and the output terminal of each flip-flop among the m flip-flops outputs one of the control signals.

2. The random number generation circuit according to claim 1, wherein the feedback circuit comprises:

an exclusive OR gate, provided with a first input terminal and a second input terminal, the first input terminal being connected to the output terminal of one of the flip-flops, and the second input terminal being connected to the output terminals of at least two of the flip-flops; and at least two switch unit circuits, each of the switch unit circuits being connected between the second input terminal and the output terminal of a corresponding flip-flop, and receiving one of the selection signals to electrically connect the second input terminal and the output terminal of the corresponding flip-flop or disconnect the second input terminal from the output terminal of the corresponding flip-flop.

3. The random number generation circuit according to claim 2, wherein each switch unit circuit comprises a fuse.

4. The random number generation circuit according to claim 1, wherein the random number generator is an n-bit random number generator, and a number of the plurality of first random numbers is $2^n-1$; and the random number generator has n first output terminals, each of the first output terminals has a fixed bit position, and n is an integer greater than 1.

5. The random number generation circuit according to claim 4, wherein the multi-selection circuit comprises:

a chip selection input terminal, configured to receive the control signals; and data input terminals, connected to the n first output terminals and configured to receive the plurality of first random numbers;

the multi-selection circuit has N different bit position adjustment modes, and each of the bit position adjustment modes corresponds to one of the control signals, wherein N is an integer greater than or equal to 1; and the multi-selection circuit is further configured to adjust bit positions of data of the n first output terminals to obtain the second random numbers.

6. The random number generation circuit according to claim 5, wherein the multi-selection circuit comprises: N adjustment unit circuits, each of the adjustment unit circuits defining one of the bit position adjustment modes; and each of the adjustment unit circuits having the data input terminals, and each of the adjustment unit circuits having the chip selection input terminal.

7. The random number generation circuit according to claim 6, wherein a bit position arrangement of the data of the n first output terminals is a first bit position arrangement, each of the adjustment unit circuits has n second output terminals, and a bit position arrangement of data of the n second output terminals is a second bit position arrangement; and each of the second bit position arrangements is different, and the second bit position arrangements are different from the first bit position arrangement.

8. The random number generation circuit according to claim 7, wherein the N adjustment unit circuits are configured that in N second bit position arrangements, a position of the second output terminal corresponding to datum of one bit is different, and a position arrangement of the second output terminals corresponding to data of remaining bits is unchanged.

9. The random number generation circuit according to claim 7, wherein at least one of the second bit position arrangements is identical to the first bit position arrangement.

10. The random number generation circuit according to claim 6, wherein the N is greater than or equal to the n.

11. The random number generation circuit according to claim 6, wherein each adjustment unit circuit comprises an N-bit input multiplexer.

12. The random number generation circuit according to claim 6, wherein a relationship between the N and the m satisfies: $N \leq 2^m-1$, the m is any natural number, and the N is any natural number greater than or equal to 2.

13. The random number generation circuit according to claim 1, wherein the control signal generation circuit is further configured that the different first random numbers are the plurality of first random numbers in different counting cycles; in a same counting cycle, the control signals are unchanged; and the control signals corresponding to one of the different counting cycles are different from the control signals corresponding to an adjacent counting cycle.

14. The random number generation circuit according to claim 13, wherein the random number generator is further configured to output an expiration signal upon end of each of the different counting cycles; and the control signal generation circuit receives the expiration signal as the trigger signal.

15. The random number generation circuit according to claim 1, wherein the control signal generation circuit is further configured that the different first random numbers comprise the plurality of first random numbers in each counting cycle, and the different first random numbers correspond to different control signals in a same counting cycle.

16. The random number generation circuit according to claim 15, wherein the random number generator is further configured to receive a driving clock signal to generate the plurality of first random numbers; and the control signal generation circuit is further configured to receive the driving clock signal as the trigger signal.

* * * * *